UNITED STATES PATENT OFFICE.

KEIZO SAKURAI, OF SAN FRANCISCO, CALIFORNIA.

TREATING CLAYS CONTAINING GYPSUM.

No. 818,124.

Specification of Letters Patent.

Patented April 17, 1906.

Application filed November 20, 1905. Serial No. 288,254.

*To all whom it may concern:*

Be it known that I, KEIZO SAKURAI, a citizen of Japan, residing in the city and county of San Francisco and State of California, have invented new and useful Improvements in Treating Clays Containing Gypsum, of which the following is a specification.

My invention or discovery relates to the manufacture of bricks, tiles, piping, and the like from clay, and pertains especially to the treatment of clays or like materials containing gypsum, so as to render them commercially valuable.

Heretofore, as far as I am aware, it has been impossible to employ raw gypsum-bearing clays or clayey material in the manufacture of brick and the like, owing to the fact that the gypsum causes the brick to crack in drying, or "check," as it is termed, by not allowing the clay to contract gradually and evenly.

I have discovered that if gypsum-bearing clays are subjected to a heat sufficient to drive off all the water of the gypsum, so as to leave the gypsum in the condition known as "dead burnt gypsum," and at the same time without changing the plastic character of the clay proper I can then use the hitherto unmarketable material to commercial advantage.

To illustrate my invention, take, for example, a common formula for clay containing gypsum, which may be said to be as follows:

Pure clay + gypsum = $Al_2 2SiO_2 2H_2O + CaSO_4 2H_2O$.

If gypsum ($CaSO_4 2H_2O$) is heated to 100° centigrade, it becomes transformed to plaster-of-paris, ($2CaSO_4 H_2O$). The presence, however, of plaster-of-paris in clay in inimical to brick or tile making, since the relative qualities of expansion and contraction of clay proper and plaster-of-paris are such as to cause "checking" or cracking of the brick or tile in drying and baking. The gypsum must be heated to approximately 200° centigrade or sufficient to drive off all of its water, so that it becomes reduced to a state known commonly as "dead burnt gypsum," with the formula $CaSO_4$. In this condition the gypsum has no counterprevailing tendency to the proper contraction of the clay in setting when made into brick and the like. On the other hand, the clay containing the gypsum must not be heated to such a high temperature as would change the character of the clay proper—that is to say, if the formula of the original clay proper is $Al_2 2SiO_2 2H_2O$ it must have that same formula practically after the heating process, which reduces the gypsum ($CaSO_4 2H_2O$) to dead burnt gypsum, ($CaSO_4$.) So, for the sake of illustration merely, my process may be said to be expressed as follows: Clay + gypsum = an uncommecial commodity; the latter + heat 200° centigrade = clay + dead burnt gypsum = a commercial commodity. This roasted clay may then be ground in the usual manner mixed with water to form a paste for use as a binder for other materials or molded and baked into a variety of useful articles.

It is possible that various modifications in my invention may be made without departing from the principle thereof, and I do not wish to be understood as limiting myself to my specific method beyond what is required by a reasonable interpretation of my claims.

Having thus described my invention, what I claim, and desire to secure by Letters Patent, is—

1. The treatment of raw clayey material containing gypsum which comprehends the heating of the material to a temperature sufficient to entirely remove all the water from the gypsum, but without altering the character of the clay of the material.

2. The herein-described process which comprehends heating raw clayey material containing gypsum, to reduce the original gypsum to the condition of dead burnt gypsum, but without dehydrating the original clay proper.

3. The herein-described process of rendering commercially valuable raw clayey material containing gypsum which comprehends heating said material to a temperature of approximately 200° centigrade.

4. The herein-described process which comprehends the preliminary heating of clayey material containing gypsum, to reduce the gypsum to the condition of dead burnt gypsum, mixing the heated material with a suitable binder to form a paste, molding the pasty material and drying the same.

5. As a new commercial commodity, clay and dead burnt gypsum formed by heating the natural original gypsum-bearing material to a sufficient heat as only to entirely dehydrate the original gypsum, leaving the clay proper unchanged.

In testimony whereof I have hereunto set my hand in presence of two subscribing witnesses.

KEIZO SAKURAI.

Witnesses:
G. ABRAHAMSON,
S. H. NOURSE.